(12) United States Patent
Klik et al.

(10) Patent No.: US 6,694,803 B2
(45) Date of Patent: Feb. 24, 2004

(54) METHOD AND SYSTEM FOR DETERMINING THE ACTUATING PRESSURE OF A SERVO CYLINDER ACTUATED BY PRESSURIZED FLUID

(75) Inventors: Stefan Klik, Hannover (DE); Ingo Meyer, Rehburg-Loccum (DE); Ralph Schumacher, Hannover (DE)

(73) Assignee: WABCO GmbH & Co., oHG, Hannover (DE)

( * ) Notice: Subject to any disclaimer, the term of this patent is extended or adjusted under 35 U.S.C. 154(b) by 0 days.

(21) Appl. No.: 10/180,365

(22) Filed: Jun. 26, 2002

(65) Prior Publication Data
US 2003/0033854 A1 Feb. 20, 2003

(30) Foreign Application Priority Data
Jun. 30, 2001 (DE) .......................................... 101 31 853

(51) Int. Cl.⁷ ........................ G01M 3/02; G01M 19/00; G01L 27/00
(52) U.S. Cl. ................. 73/37; 73/1.71; 73/168
(58) Field of Search ......................... 73/37, 1.71, 1.72, 73/47, 168

(56) References Cited

U.S. PATENT DOCUMENTS 4,646,556 A * 3/1987 Courcoux et al. ........... 73/1.68
6,532,980 B1 * 3/2003 Langeveld ..................... 73/37

FOREIGN PATENT DOCUMENTS

DE 195 13 032 C1 8/1996
DE 199 18 164 A1 10/2000
DE 199 31 973 A1 1/2001

* cited by examiner

*Primary Examiner*—Michael Cygan
(74) *Attorney, Agent, or Firm*—Kramer Levin Naftalis & Frankel LLP

(57) ABSTRACT

A method and system for determining the actuating pressure of a servo cylinder that is actuated by pressurized fluid. The actuation displacement of the servo cylinder is obtained from a sensor or other device. A pressure sensor measures inflow pressure at one point of a pressurized fluid line supplying the servo cylinder. The actuating pressure is determined based on the inflow pressure and the change in the actuation displacement of the servo cylinder.

29 Claims, 2 Drawing Sheets

METHOD AND SYSTEM FOR DETERMINING THE ACTUATING PRESSURE OF A SERVO CYLINDER ACTUATED BY PRESSURIZED FLUID

BACKGROUND OF THE INVENTION

The present invention is directed generally to an improved method and system for determining the actuating pressure of a servo cylinder actuated by pressurized fluid.

DE 199 31 973 A1, which is incorporated herein by reference, discloses a device for controlling a servo assembly for a manual shift gearbox for a motor vehicle. The servo assembly is provided with two servo cylinders operated by pressurized fluid, e.g., hydraulic fluid. The cylinders actuate a gearbox actuating element, which in conventional manual shift gearboxes is the manual shift lever, in longitudinal and transverse directions.

Selection of gates and gears is possible at the gearbox. The servo cylinder for gate selection is known as the "gate cylinder;" the servo cylinder for gear selection is known as the "gear cylinder."

In engaging a gear, it is desired that the gear cylinder be capable of being operated with relatively fine and accurate increments of positional force to ensure that synchronization of the toothed gears of the gearbox, or of the synchronizing rings, is accomplished smoothly and with minimal wear. Because in pressurized fluid operated servo cylinders of the type disclosed in DE 199 31 973 A1 a physical relationship or proportionality exists between the output positional force and the actuating pressure present in the servo cylinder, the area of the piston face of the servo cylinder being the proportionality constant, incremental delivery of positional force can be achieved by incrementing the actuating pressure. For this purpose, it is desirable to determine the actuating pressure of the servo cylinder as accurately as possible.

For cost reasons, and in order to minimize the complexity of the servo assembly, it is generally not desirable to utilize a pressure sensor at the servo cylinder specifically for determination of the actuating pressure. Instead, as disclosed in DE 199 31 973 A1, a pressure sensor located elsewhere, typically upstream of the servo cylinder, is utilized. Depending on the operating position of the valves of the servo assembly, the pressure sensor can detect different pressures, such as the inflow pressure of the pressure supply or a pressure comparable to the actuating pressure of the servo cylinder. However, the further the pressure sensor is from the point where pressure is to be measured, the less accurate the measurement.

It is desired to provide an improved, more accurate approach for determining the actuating pressure of a servo cylinder actuated by pressurized fluid for regulating the actuating pressure of and actuating force output by the servo cylinder based thereon.

SUMMARY OF THE INVENTION

Generally speaking, in accordance with the present invention, a method and associated system for determining the actuating pressure of a servo cylinder actuated by pressurized fluid for regulating the actuating pressure of and actuating force output by the servo cylinder based thereon are provided that improves over prior art methods and arrangements.

In a preferred embodiment of the system according to the present invention, the servo cylinder is a double-acting servo cylinder having pressurized fluid inflow and outflow ports for supplying a pair of pressurized fluid chambers. A pump supplies the servo cylinder with pressurized fluid via pressurized fluid lines or conduits. A pair of electromagnetically actuated 3/2-way valves are provided in fluid communication with the servo cylinder. An electromagnetically actuated 2/2-way valve functions as a pressure modulator.

Single-acting servo cylinders having one fluid port and one fluid chamber can also be used in the system according to the present invention.

An electronic control unit is provided to control valve actuation and thereby modulate the fluid pressure and regulate the actuating pressure and output actuating force of the servo cylinder as determined in accordance with the method of the present invention. In vehicle gearbox control applications of the method and system according to the present invention, actuating force curves representing predetermined servo cylinder operation can be programmed into the electronic control unit to facilitate smooth and precise gearbox operation.

In accordance with the method and system of the present invention, the actuating pressure of the servo cylinder, which relates to the positional force of the servo cylinder, can be determined with a high degree of accuracy and with minimal computational effort by using the positional displacement of the servo cylinder, a value that is necessary in any case for servo cylinder controllers. The positional displacement can be obtained from an existing source, such as from a displacement sensor integrated into the servo cylinder or mounted externally. Alternatively, the positional displacement can be obtained from a device connected to the servo cylinder, for example, a gearbox provided with a displacement sensor, that is capable of transmitting the displacement information, e.g., over a data bus, to a control device such as the electronic control unit.

A pressure sensor provided for measuring the inflow pressure is desirably located along the pressurized fluid line leading to the servo cylinder at a point that is upstream of the extended servo cylinder proximate to the pressure outlet of the electromagnetically actuated 2/2-way valve. At this location, a higher pressure level is present at the pressure sensor than in the servo cylinder, as the line leading to the servo cylinder causes pressure loss. By virtue of the higher pressure level at the pressure sensor, a higher signal resolution and a more accurate pressure reading is possible than could be obtained by sensing pressure directly at the servo cylinder.

A value representing the flow velocity of pressurized fluid through the line can be determined from the positional displacement of the servo cylinder or from the change of positional displacement. This can be accomplished by differentiation of the positional displacement with respect to time. In systems where time is measured digitally, the change of positional displacement can be computed by means of difference ratios.

The temperature effect, which influences the density of the pressurized fluid, can also be taken into consideration. For example, based on the temperature of the pressurized fluid measured using a temperature sensor, a corrected density of the pressurized fluid as a function of the temperature can be computed.

Accordingly, it is an object of the present invention to provide a method and associated system capable of determining the actuating pressure of a servo cylinder with a high degree of accuracy and minimal computational effort.

It is an additional object of the present invention to provide a method and system for regulating the actuating pressure of and actuating force output by a servo cylinder to enable the operation of a motor vehicle gear cylinder with fine and accurate increments of positional force.

It is also an object of the present invention to provide a method and system for determining the actuating pressure of a servo cylinder for regulating the actuating pressure of and actuating force output by the servo cylinder based thereon that is cost effective and minimizes instrumental complexity.

It is another object of the present invention to provide a method and system for determining the actuating pressure of and actuating force output by a servo cylinder that senses different pressure values utilizing one pressure sensor.

It is a further object of the present invention to provide a method and system for determining the actuating pressure of and actuating force output by a servo cylinder that takes into consideration the positional displacement of the servo cylinder.

It is a still further object of the present invention to provide a method and system for determining the actuating pressure of and actuating force output by a servo cylinder that takes into consideration the temperature of the pressurized fluid.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

Figure 1:
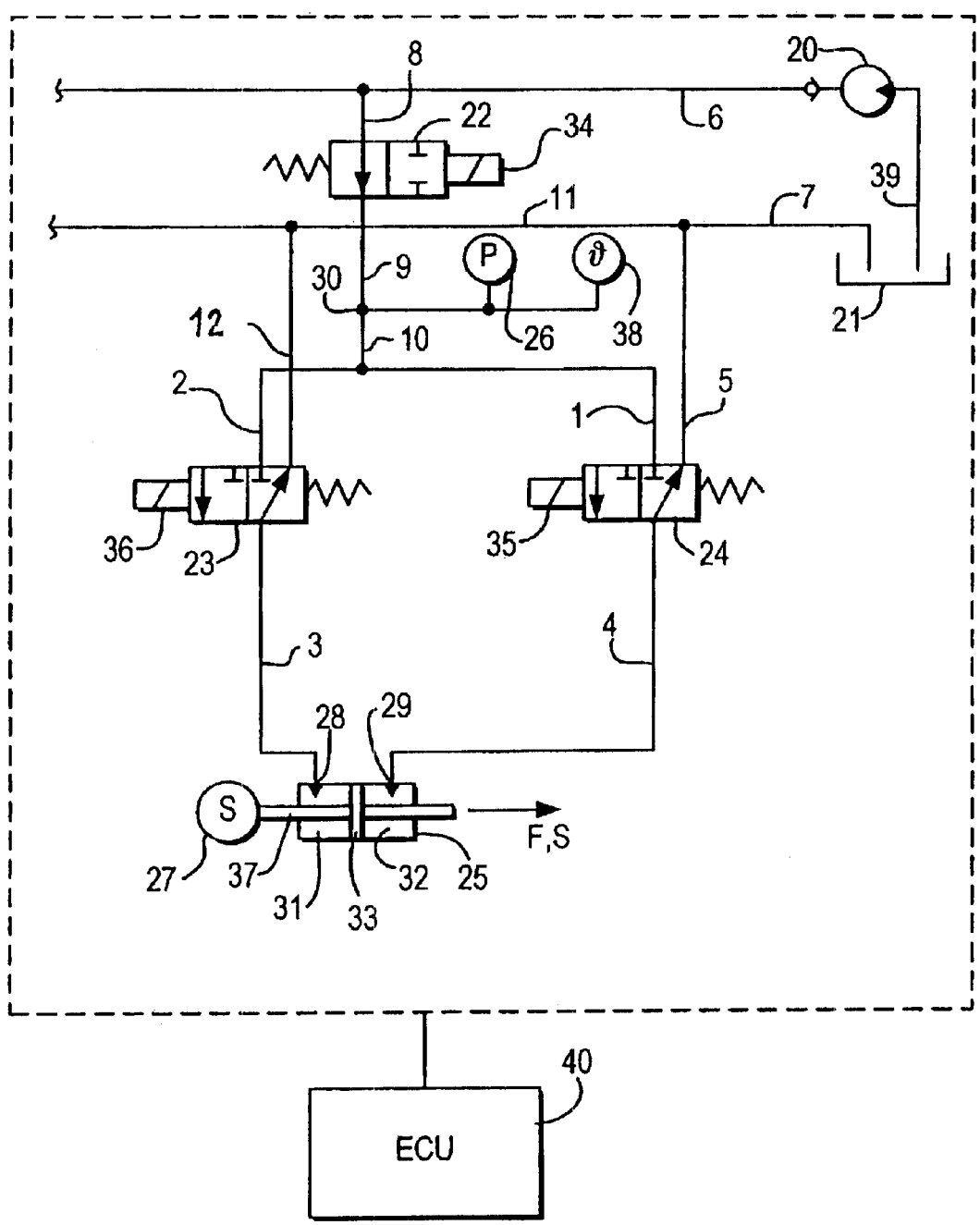
FIG. 1 is a schematic diagram of a conventional gear cylinder and activation circuitry forming part of a servo assembly for a gearbox utilized in the method and system according to the present invention.

Referring now to the drawing figures where like reference numbers are used for corresponding elements, FIG. 1 shows a gear cylinder and activation circuitry according to DE 199 31 973 A1 forming part of a servo assembly for a gearbox and utilized in the method and system according to the present invention. A servo cylinder 25 is used as a gear cylinder in a hydraulic gearbox control device.

As shown in FIG. 1, servo cylinder 25 is preferably designed as a double-acting servo cylinder with pressurized fluid inflow and outflow ports 28, 29 for supplying pressurized fluid chambers 31, 32, located on opposite sides of a piston 33, with hydraulic fluid. It should be understood, however, that a single-acting servo cylinder, for example, one with only one pressurized fluid port 28 and one pressurized fluid chamber 31, can also be used. In such case, an external mechanical force, such as a restoring spring or a restoring force exerted by a change gearbox connected to the servo cylinder, can be utilized in lieu of pressurized fluid chamber 32 used for return displacement in the double-acting servo cylinder.

At its pressurized fluid ports 28, 29, double-acting servo cylinder 25 is connected via pressurized fluid lines 3, 4 to electromagnetically actuated 3/2-way valves 23, 24, respectively. Valves 23, 24 can be operated in two positions. In each valve, one position is provided to allow the inflow of pressurized fluid via the respective line 3, 4 into the respective pressurized fluid chamber 31, 32. The other position permits the outflow of pressurized fluid from pressurized fluid chambers 31, 32 via lines 3, 4, respectively.

In their inflow positions, valves 23, 24 are connected via pressurized fluid lines 2, 1, respectively, to a pressurized fluid line 10 and, via a pressurized fluid line 9, are in communication with an electromagnetically actuated 2/2-way valve 22 functioning as a pressure modulator. Valve 22 is in communication via a pressurized fluid line 8 with a pressurized fluid feed line 6. Further load points (not shown) can be connected to pressurized fluid feed line 6. Feeding of pressurized fluid into line 6 is accomplished by pump 20 and a non-return valve of conventional design. Pump 20 transports pressurized fluid having a low pressure level from a pressurized fluid reservoir 21 via a pressurized fluid line 39.

In their outflow positions, valves 23, 24 are connected to a pressurized fluid return line 7 via pressurized fluid lines 12, 5 respectively. Pressurized fluid return line 7, to which further load points (not shown) can be connected for the purpose of return feed of pressurized fluid, is used for returning unneeded pressurized fluid to pressurized fluid reservoir 21.

A pressure sensor 26 is provided for measuring the pressure at a point 30, which is the junction of pressurized fluid lines 9, 10. Pressure sensor 26 is preferably disposed on the outlet side of valve 22, and is therefore particularly suited for directly sensing the inflow pressure established by valve 22. Pressure sensor 26 delivers a pressure signal (p) which corresponds to the pressure measured at point 30.

Additionally, a displacement sensor 27 is connected to a piston rod 37 connected to piston 33 of servo cylinder 25. Displacement sensor 27 delivers a displacement signal (s) corresponding to the actuation (positional) displacement of servo cylinder 25.

Sensors 26, 27 are electrically connected to an electronic control unit (ECU) 40 for controlling the functions described in greater detail hereinafter. The electronic control unit is also electrically connected to electromagnets 34, 35, 36 of valves 22, 24, 23, respectively, and can energize and de-energize the valves. The pressure in line 9, as well as in the parts connected thereto, can be adjusted by energizing and de-energizing valve 22.

Based on sensor input signals (p, s), the electronic control unit can adjust the actuating force (F) output by servo cylinder 25 by controlling the actuation of valves 22, 23, 24. As described in greater detail hereinafter with reference to FIG. 2, this is accomplished in accordance with actuating force curves preprogrammed into the electronic control unit that describe ideal servo cylinder operations. Since the actuating force (F) is directly proportional to the difference between the pressure ($p_1$) in pressurized fluid chamber 31 and the pressure ($p_2$) in pressurized fluid chamber 32 multiplied by the proportionality constant represented by effective area (A) of piston 33, the electronic control unit can adjust actuating force (F) by modulation and control of the pressure difference ($p_1-p_2$). The proportionality constant area (A) can be stored in the control unit. The control unit preferably applies this relationship:

$$F = (p_1 - p_2) \cdot A \quad [1]$$

Only the pressure signal (p) at point 30 and displacement signal (s) are available to the electronic control unit for determination of the pressure difference ($p_1-p_2$). The pressure signal (p) at point 30 does not correspond exactly to the pressure difference ($p_1-p_2$), because of the interposed line segments, as well as valves 23, 24 and the resulting flow resistances. By way of example, in the case of a pressure rise in pressurized fluid chamber 31, which corresponds to an extension of servo cylinder 25, valve 23 is switched so as to establish communication between pressurized fluid chamber 31 and pressure modulating valve 22 via lines 3, 2, 10. Valve 24 is switched to a pressure outflow position, in which the pressurized fluid can flow back from pressurized fluid chamber 32 via lines 4, 5, 7 into pressurized fluid reservoir 21. In this case, the pressure ($p_1$) in pressurized fluid chamber 31 corresponds to pressure (p) reduced by the flow resistances of lines 10, 2, 3 and of valve 23. The oppositely acting pressure ($p_2$) in pressurized fluid chamber 32 corresponds to a pressure ($p_0$), such as the ambient pressure, that is present in pressurized fluid reservoir 21 and is known to the electronic control unit, increased by the pressure losses caused by the flow resistances of pressurized fluid lines 4, 5, 7 and of valve 24.

In general, such pressure losses can be computed from the following relationship:

$$\Delta p = \xi \cdot \frac{\rho}{2} \cdot v^2 \quad [2]$$

where:
  $\xi$ is the resistance for a particular pressurized fluid element
  $\rho$ is the density of the pressurized fluid
  v is the flow velocity of the pressurized fluid The flow resistance ($\xi$) in a straight pipe, for example, can be computed from the following relationship:

$$\xi_{pipe} = \lambda \cdot \frac{1}{d} \quad [3]$$

where:
  l is the length of the pipe
  d is the diameter of the pipe
  $\lambda$ is the specific drag coefficient for the pipe and is related to the roughness of the inside wall of the pipe.

The flow resistance ($\xi$) of other flow conveying parts, such as pipe elbows or valves 23, 24, is preferably determined experimentally using equation [2] above. For certain arrangements, the flow resistance can also be computed (see, e.g., *Oil Hydraulics*, by Dietmar Findeisen and Franz Findeisen, published by Springer-Verlag).

The density ($\rho$) is a known material constant representing the ratio of a quantity of mass to a quantity of volume of a material. In accordance with one embodiment of the present invention, the temperature dependence of the density ($\rho$) on the fluid temperature can also be taken into consideration, as expressed by the relationship:

$$\rho(\theta) = \rho_{15° C.} \cdot \frac{1}{1 + \alpha_v \cdot (\theta - 15° C.)} \quad [4]$$

where:
  $\theta$ represents temperature in ° C.
  $\alpha_v$ represents a known fluid specific temperature coefficient
  $\rho_{15° C.}$ represents the fluid density at 15° C.

By using a temperature sensor 38 to measure the temperature of the pressurized fluid and transmit it via signal ($\theta$) to the electronic control unit, temperature compensation can be applied according to equation [4] above by determining the fluid density that actually exists at a given temperature and inserting it into equation [2] above in the place of $\rho$.

It should be understood that kinetic pressure (dynamic pressure) is taken into consideration in computing the pressure difference ($\Delta p$), while the terms expressing the geodetic pressure (weight pressure) are sufficiently small that they may be disregarded. Such a simplification does not lead to noteworthy inaccuracies in small hydraulic systems such as a gearbox controller.

Flow resistances occurring in the respective inflow lines, together with the density ($\rho$) and the factor ½, as indicated in equation [2] above, can be combined into a single constant. This constant can be determined experimentally during the development of the pressurized fluid system or of a gearbox controller and programmed into the electronic control unit. Preferably, the same procedure is also applied to the pressurized fluid outflow lines so that, with respect to the operating conditions of the functions of extending the servo cylinder and retracting the servo cylinder, four constants are obtained, as set forth in Table 1 below:

TABLE 1

| Function/Operating Condition | Constant |
|---|---|
| extend servo cylinder, pressurized fluid inflow | $c_1$ representing flow resistances of line portions 10, 2, 3 and of valve 23 |
| extend servo cylinder, pressurized fluid outflow | $c_2$ representing flow resistances of line portions 4, 5, 7 and of valve 24 |
| retract servo cylinder, pressurized fluid inflow | $c_3$ representing flow resistances of line portions 10, 1, 4 and of valve 24 |
| retract servo cylinder, pressurized fluid outflow | $c_4$ representing flow resistances of line portions 3, 12, 11, 7 and of valve 23 |

Using these constants ($c_1$, $c_2$, $c_3$, $c_4$), the actuating pressure during extension of the servo cylinder can be determined from the inflow pressure (p) according to the following relationship:

$$p_1 = p - (c_1 - c_2) \cdot v^2 \quad [5]$$

where v is the flow velocity of the pressurized fluid

Flow velocity (v) generally depends on the flow cross section. As a result, it will vary during flow through several line segments and valves. The flow velocity (v) is preferably determined according to equation [5] from the time change of the displacement signal (s), that is, by differentiation with respect to time or, in digital controllers, by means of difference ratios.

Since constants $c_1$, $c_2$, $c_3$, $c_4$ can be determined experimentally as functions of the variation (ds/dt) of the displacement signal, further conversions are unnecessary. As a result, the actuating pressure ($p_1$) can be computed as follows:

$$p_1 = p - (c_1 - c_2) \cdot \left(\frac{ds}{dt}\right)^2 \quad [6]$$

For retraction of servo cylinder 25, the actuating pressure ($p_2$) then present in pressurized fluid chamber 32 can be determined as follows:

$$p_2 = p - (c_3 - c_4) \cdot \left(\frac{ds}{dt}\right)^2 \quad [7]$$

For a single-acting servo cylinder, the following relationship applies:

$$p_1 = p - c_1 \cdot \left(\frac{ds}{dt}\right)^2 \quad [8]$$

By using the displacement signal (s) for sensing the actuation displacement of servo cylinder 25 and for computing the pressure, very accurate regulation of the actuating pressure of the servo cylinder and of the output actuating force (F) can be achieved with the use of only one pressure sensor 26 in a gearbox controller. Such precise force modulation is desirable during the operation of a gearbox control device in an automatic change gearbox, particularly during the engagement of the gear, which, in the present example, corresponds to the extension of servo cylinder 25. It is desirable that the synchronizing rings, which at first rub against one another and then intermesh with one another during engagement of the gear, are moved gently toward one another. On the other hand, it is also desired that engagement of the gear occur as quickly as possible, but preferably no slower than the gear change time realized by a human operator. In order to satisfy these conflicting goals, certain actuating force curves discussed below are preferably programmed into the electronic control unit for controlling the gearbox.

Figure 2A:
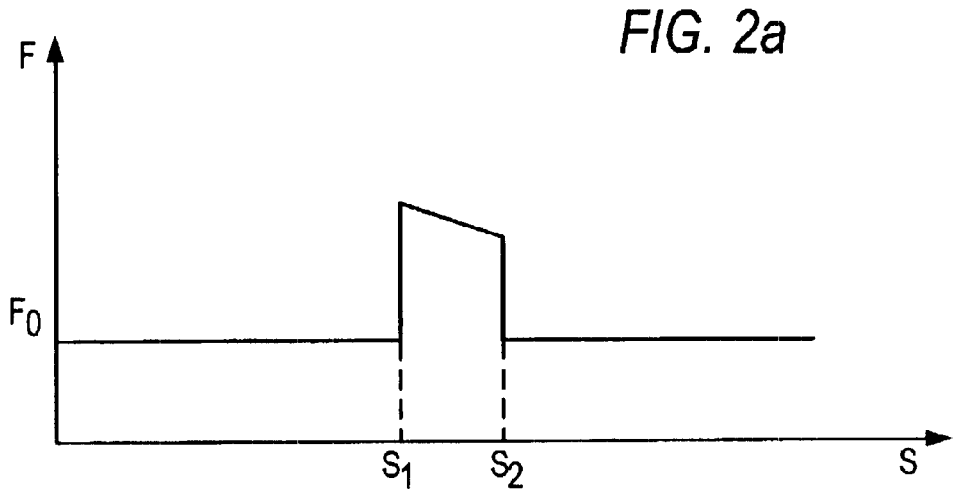
FIG. 2a is a graphical representation showing a relationship utilized in the method and system according to the present invention of actuating force versus displacement of the servo cylinder of a servo assembly for a gearbox during the process of engaging a gear.
Figure 2B:
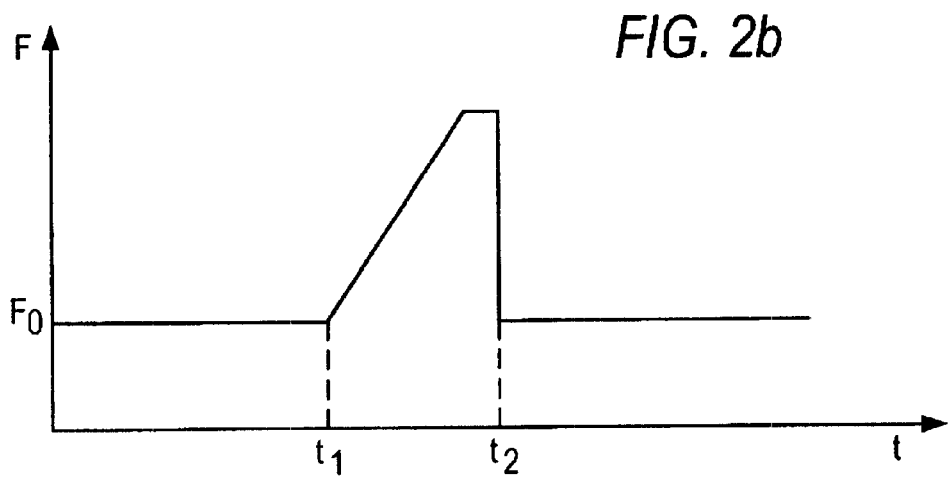
FIG. 2b is a graphical representation showing a relationship utilized in the method and system according to the present invention of actuating force output by the servo cylinder of a servo assembly for a gearbox versus time during the process of engaging a gear.
Figure 2C:
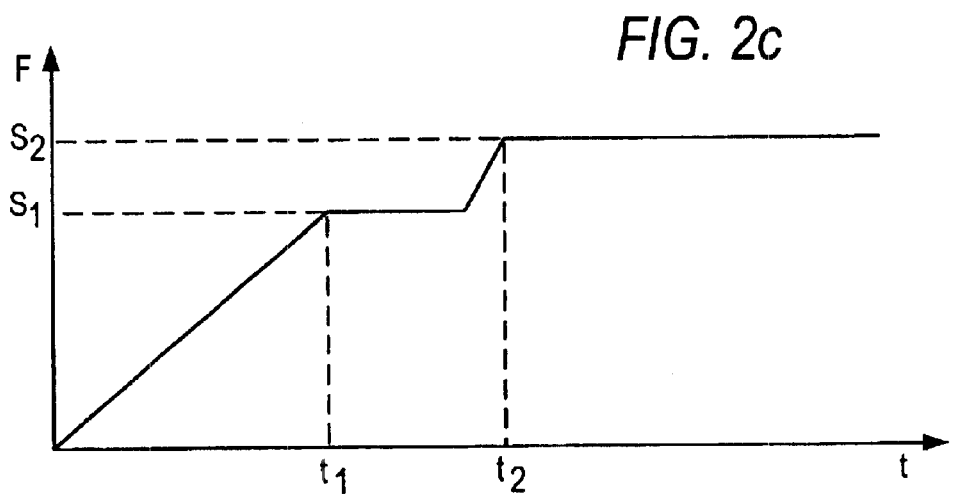
FIG. 2c is a graphical representation showing a relationship utilized in the method and system according to the present invention of displacement of the servo cylinder of a servo assembly versus time during the process of engaging a gear.

FIGS. 2a–2c represent the process of engaging a gear by extending servo cylinder 25. FIG. 2a shows a curve of the actuating force (F) versus the displacement (s); FIG. 2b shows the actuating force (F) versus time (t); FIG. 2c shows the displacement (s) versus time (t). The graphs according to FIGS. 2b and 2c are correlated with one another with respect to the abscissa, while FIGS. 2a and 2b are correlated with one another through time $t_1$ and the displacement point $s_1$. Because of their different physical variables, the abscissas of FIGS. 2a and 2b do not otherwise correlate directly with one another.

Starting from the neutral position (s=0) of servo cylinder 25, an actuating force ($F_0$) is output and remains substantially constant until the synchronizing rings of the change gearbox come together at time $t_1$ and at displacement point $s_1$, where at first the rings have different speeds and cannot yet intermesh. At time $t_1$, the actuating force (F) is then steadily increased according to FIG. 2b, while at the same time, as shown in FIG. 2a, the change in displacement is small. This small change in displacement is due to elastic deformation of the synchronizing rings and other gearbox parts.

When the synchronizing rings reach matching speeds, they become intermeshed, as is evident from the sudden drop of the actuating force (F) at time $t_2$, where synchronization is achieved and the electronic control unit reduces the actuating force (F) back to $F_0$. The displacement signal is then located at displacement point $s_2$. Thereafter, the servo cylinder acts to hold the synchronizing rings and the gear in engagement.

Accordingly, the present invention provides an improved method and associated system for determining the actuating pressure of a servo cylinder actuated by pressurized fluid that is more accurate than in prior art systems, and that avoids undue complexity and cost. The actuating pressure determined according to the method and system of the present invention is used for regulating the actuating pressure of and actuating force output by the servo cylinder. It should be appreciated that the present invention enables the operation of a motor vehicle gear cylinder with fine and accurate increments of positional force.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for determining the actuating pressure of a servo cylinder actuated by pressurized fluid, comprising the steps of measuring fluid pressure into a servo cylinder at a position along a conduit supplying said servo cylinder with pressurized fluid, measuring a change in positional displacement of said servo cylinder under said fluid pressure, and calculating an actuating pressure for said servo cylinder based on said fluid pressure and said change in positional displacement.

2. The method according to claim 1, wherein said step of measuring fluid pressure is accomplished using a pressure sensor located on said conduit at a position upstream of said servo cylinder.

3. The method according to claim 1, wherein said step of measuring said change in positional displacement of said servo cylinder is accomplished using a displacement sensor.

4. The method according to claim 1, further comprising the step of regulating an output positional force of said servo cylinder based on said actuating pressure.

5. The method according to claim 4, wherein said step of regulating said output positional force of said servo cylinder based on said actuating pressure is accomplished in a hydraulic gearbox controller.

6. A method for determining the actuating pressure of a servo cylinder actuated by pressurized fluid, comprising the steps of measuring fluid pressure into a servo cylinder at a position along a conduit supplying said servo cylinder with pressurized fluid, measuring a change in positional displacement of said servo cylinder under said fluid pressure, determining flow velocity of said pressurized fluid through said conduit based on said change in positional displacement of said servo cylinder, and calculating an actuating pressure for said servo cylinder based on said fluid pressure and said change in positional displacement.

7. A method for determining the actuating pressure of a servo cylinder actuated by pressurized fluid, comprising the steps of measuring fluid pressure into a servo cylinder at a position along a conduit supplying said servo cylinder with pressurized fluid, measuring a change in positional displacement of said servo cylinder under said fluid pressure, measuring the temperature of said pressurized fluid, and calculating an actuating pressure for said servo cylinder based on said fluid pressure and said change in positional displacement.

8. The method according to claim 7, wherein the step of measuring the temperature of said pressurized fluid is accomplished using a temperature sensor.

9. The method according to claim 7, wherein said step of calculating an actuating pressure for said servo cylinder takes into consideration the temperature of said pressurized fluid.

10. The method according to claim 1, wherein said servo cylinder is actuated by a pair of 3/2-way valves and said servo cylinder includes a pressurized fluid inflow port in communication with a pressure sensor for measuring said fluid pressure.

11. A method for determining the actuating pressure of a servo cylinder actuated by pressurized fluid, comprising the steps of measuring fluid pressure into a servo cylinder at a position along a conduit supplying said servo cylinder with pressurized fluid, measuring a change in positional displacement of said servo cylinder under said fluid pressure, and calculating an actuating pressure for said servo cylinder based on said fluid pressure and said change in positional displacement by adjusting said measured fluid pressure based on pressure loss due to resistance to the flow of said pressurized fluid in said conduit supplying said servo cylinder with said pressurized fluid, density of said pressurized fluid and flow velocity of said pressurized fluid.

12. The method according to claim 11, further comprising the steps of determining the length, diameter and drag coefficient of said conduit supplying said servo cylinder with said pressurized fluid and calculating said resistance to the flow of said pressurized fluid based on said length, diameter and drag coefficient.

13. The method according to claim 11, further comprising the steps of measuring the temperature of said pressurized fluid, and determining said density of said pressurized fluid based on said temperature.

14. The method according to claim 11, further comprising the step of determining flow velocity of said pressurized fluid through said conduit based on said change in positional displacement of said servo cylinder.

15. The method according to claim 1, further comprising the step of adjusting said fluid pressure to yield said actuating pressure.

16. The method according to claim 15, wherein said step of adjusting said fluid pressure to yield said actuating pressure is accomplished by modulating said fluid pressure in accordance with programmed actuating force curves.

17. A system for determining the actuating pressure of a servo cylinder actuated by pressurized fluid, comprising a servo cylinder for actuating a mechanical device, a source of pressurized fluid, at least one conduit for supplying said servo cylinder with said pressurized fluid, means for measuring fluid pressure into said servo cylinder at a position along said conduit, means for measuring positional displacement of said servo cylinder under said fluid pressure, and means for calculating an actuating pressure for said servo cylinder based on said measured fluid pressure and said measured positional displacement.

18. The system according to claim 17, wherein said means for measuring fluid pressure into said servo cylinder is a pressure sensor located on said conduit at a position upstream of said servo cylinder.

19. The system according to claim 17, wherein said means for measuring positional displacement of said servo cylinder is a displacement sensor.

20. The system according to claim 17, further comprising means for regulating an output positional force of said servo cylinder based on said actuating pressure.

21. A system for determining the actuating pressure of a servo cylinder actuated by pressurized fluid, comprising a servo cylinder for actuating a mechanical device, a source of pressurized fluid, at least one conduit for supplying said servo cylinder with said pressurized fluid, means for measuring fluid pressure into said servo cylinder at a position along said conduit, means for measuring positional displacement of said servo cylinder under said fluid pressure, a temperature sensor for measuring the temperature of said pressurized fluid, and means for calculating an actuating pressure for said servo cylinder which is based on said measured fluid pressure and said measured positional displacement.

22. The system according to claim 17, wherein said servo cylinder includes at least one pressurized fluid port and at least one pressurized fluid chamber in fluid communication with said at least one pressurized fluid port.

23. The system according to claim 22, further comprising at least one valve in fluid communication with said at least one pressurized fluid port.

24. The system according to claim 23, wherein said at least one valve is a pair of 3/2-way valves.

25. The system according to claim 24, wherein said at least one pressurized fluid port includes a fluid inflow port, and said means for measuring fluid pressure into said servo cylinder is a pressure sensor in communication with said inflow port.

26. A system for determining the actuating pressure of a servo cylinder actuated by pressurized fluid, comprising a servo cylinder for actuating a mechanical device, a source of pressurized fluid, at least one conduit for supplying said servo cylinder with said pressurized fluid, means for measuring fluid pressure into said servo cylinder at a position along said conduit, means for measuring positional displacement of said servo cylinder under said fluid pressure, means for adjusting said fluid pressure based on pressure loss due to resistance to the flow of said pressurized fluid in said at least one conduit, density of said pressurized fluid and flow velocity of said pressurized fluid, and means for adjusting said fluid pressure to yield an actuating pressure for said servo cylinder which is based on said measured fluid pressure and said measured positional displacement.

27. The system according to claim 17, wherein said means for adjusting said fluid pressure to yield said actuating pressure includes an electronic control unit arranged and constructed to modulate said fluid pressure in accordance with actuating force curves programmed therein.

28. The system according to claim 17, wherein said mechanical device is a hydraulic gearbox controller.

29. A system for determining the actuating pressure of a servo cylinder actuated by pressurized fluid, comprising a servo cylinder for actuating a mechanical device, a source of pressurized fluid, at least one conduit for supplying said servo cylinder with said pressurized fluid, means for measuring fluid pressure into said servo cylinder at a position along said conduit, means for measuring a change in positional displacement of said servo cylinder under said fluid pressure, means for determining flow velocity of said pressurized fluid through said conduit based on said change in positional displacement of said servo cylinder, and means for calculating an actuating pressure for said servo cylinder based on said fluid pressure and said change in positional displacement.

* * * * *